Patented Jan. 13, 1931

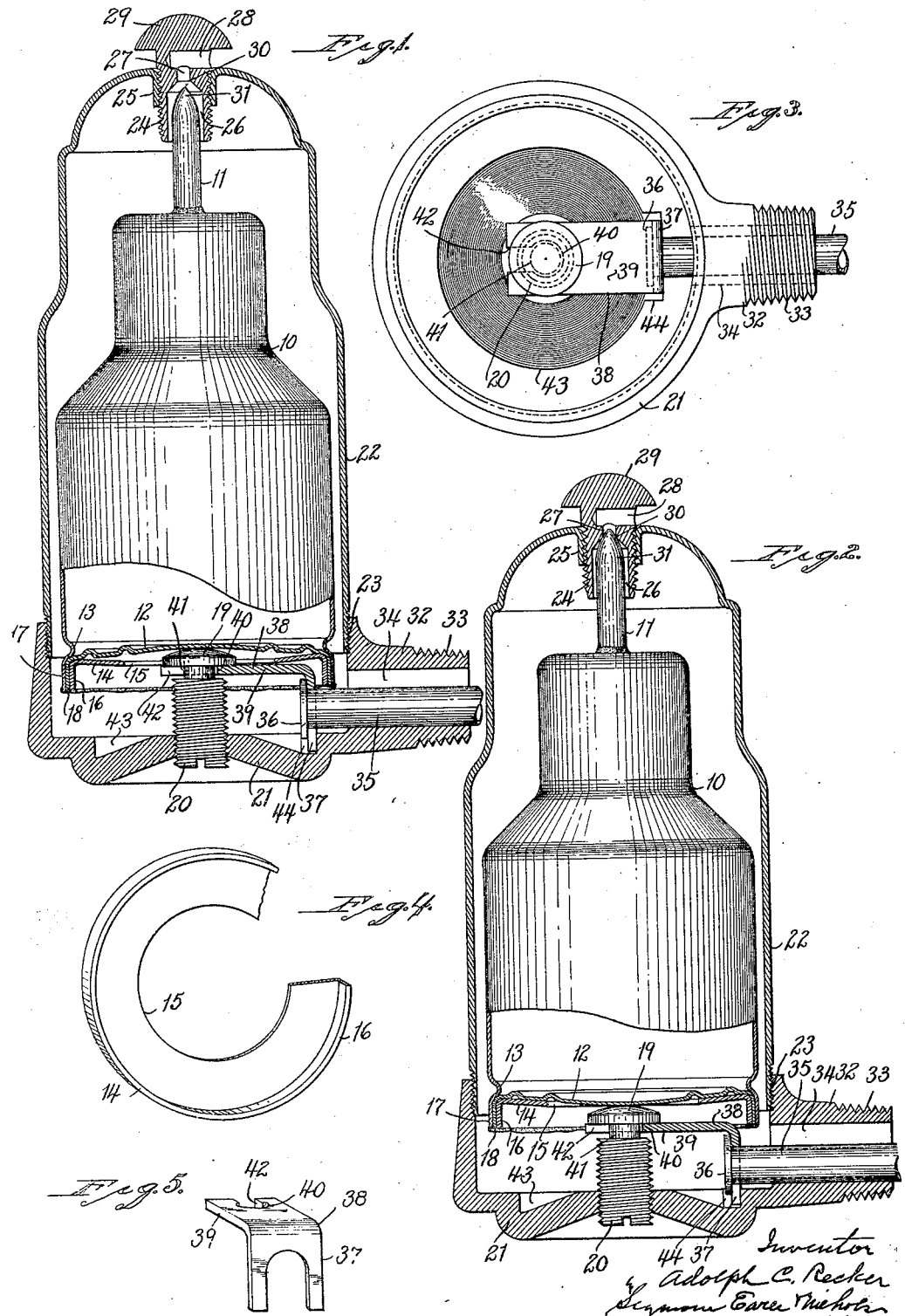

1,789,156

UNITED STATES PATENT OFFICE

ADOLPH C. RECKER, OF OAKVILLE, CONNECTICUT, ASSIGNOR TO CHASE COMPANIES INCORPORATED, OF WATERBURY, CONNECTICUT, A CORPORATION

AUTOMATIC VALVE

Application filed June 28, 1929. Serial No. 374,321.

This invention relates to an improved automatic valve for use in connection with steam radiators and of the type designed to automatically permit the expulsion of air from the radiator and prevent the egress of water therefrom.

One of the main objects of my invention is to provide a superiorly-sensitive automatic valve of the type referred to constructed with particular reference to its capacity for withstanding long service without failure of the parts.

Another object of my invention is to provide an automatic valve which will not require a delicate setting or adjustment to enable it to function properly and to withstand long service.

With the above and other objects in view, my invention consists in an automatic valve having certain details of construction and combinations of parts as will be hereinafter described and particularly recited in the claims.

In the accompanying drawings:

Fig. 1 is a vertical sectional view of an automatic valve constructed in accordance with my invention, the parts being shown in the positions due them when the float is not subjected to heat;

Fig. 2 is a similar view but showing the parts in the positions due them when the float has been subjected to heat to outwardly flex its diaphragm;

Fig. 3 is a top or plan view of the base-member of the casing, together with the siphon-tube and the retaining-means therefor;

Fig. 4 is a broken perspective view of the limiting-ring; and

Fig. 5 is a detached perspective view of the L-shaped siphon-tube retainer.

In carrying out my invention as herein shown, I employ a hollow sheet-metal float 10 contracted at its upper end and provided with an upstanding valve-plunger 11 and having its lower end closed by a cup-shaped flexible diaphragm 12 seated against an annular bead 13 inwardly spun from the metal of the float 10 near the lower end thereof.

Seated within the cup-shaped diaphragm 12 is a limiting-ring 14 formed with a central clearance-opening 15 and with an outwardly-extending flange or skirt 16 which parallels the flange of the diaphragm 12. The cup-shaped diaphragm 12 and the limiting-ring 14 are retained in place in the slightly-flared lower end 17 of the float 10 by solder 18 which serves to hermetically seal the lower end of the said float.

The float 10 above described is charged with a small quantity of highly-volatile fluid such as ether, which readily gasifies and expands under the action of heat, so as to generate sufficient pressure within the float to flex the diaphragm 12 outward for the purpose as will hereinafter appear.

The diaphragm 12 is tensioned so that it will normally, in the absence of pressure within the float 10, be flexed inward in the position in which it is shown in Fig. 1, and rests upon the crowned upper face of the head 19 of an adjusting-screw 20 threaded into the lower end of the base-member 21 of the casing, which latter also comprises a domical sheet-metal shell 22 threaded into the said base as at 23 and provided at its upper end with an axially-arranged valve-seat member 24 externally-threaded and engaging threads upon the inwardly-turned annular flange 25 of the said shell-member.

The valve-seat member 24 is formed with a relatively-large vertical passage 26 in which the valve-plunger 11 rides and intersects a smaller-diameter co-axial passage 27 in turn intersecting a horizontal vent-passage 28 extending radially outward through the side wall of the valve-seat member 24 beneath the overhanging domical head 29 thereof. The junction of the passages 26 and 27 serves to form a valve-seat 30 with which the tapered upper end 31 of the valve-plunger 11 is adapted to engage to prevent the escape of steam and water from the valve-casing, as will hereinafter appear.

The base-member 21 of the casing is formed with an integral radial nipple 32 provided at its outer end with external threads 33 for connecting the valve-structure to a steam-radiator and formed with a radial passage 34 through which steam, air and water are admitted to the interior of the casing.

Extending outward through the passage 34 of the nipple 32 is the usual siphon-tube 35 having at its inner end an out-turned flange 36 which is straddled by the bifurcated vertical arm 37 of an L-shaped retainer 38.

The horizontal arm 39 of the retainer 38 is formed with a vertical passage 40 for the reception of the neck 41 of the adjusting-screw 20 and is intersected by a radial passage 42 which is slightly smaller in width than the diameter of the neck 41 so that when the latter is passed therethrough and entered into the vertical passage 40, the said adjusting-screw and retainer will be yieldingly coupled together as a unit.

The inner or upper face of the bottom wall of the base-member 21 of the casing is formed with an annular recess 43 having a shallow notch 44 leading radially therefrom (Fig. 3) to receive the lower end of the bifurcated arm 37 of the retainer 38 to prevent the same from moving radially outward. The depth of the notch 44 is sufficient to permit the retainer 38 to have the necessary amount of vertical movement with the adjusting-screw 20 as the latter is moved in or out to adjust the vertical position of the float 10 within the casing.

It has long been recognized that a relatively-large-diameter diaphragm is most desirable to insure sensitiveness and long life and to effect a relatively-greater movement of the float. However, I have discovered that one of the major reasons for the failure of automatic valves of the type to which my invention relates is due to the fact that the diaphragm—especially if of a large diameter—becomes strained when the volatile fluid within the float becomes expanded by heat so as to flex the diaphragm outward.

By providing the limiting-ring 14 I am enabled to employ a relatively-large-diameter diaphragm 12, with the many resultant advantages and still prevent the same from becoming strained so as to fail to function properly.

By providing a bottom adjusting-screw 20 which it is intended shall be soldered in place after adjustment, I am enabled to assemble the valve completely after the exterior of the casing has been plated. After testing the mechanism and appropriately setting the adjusting-screw 20, I apply solder thereto to lock it in place without, however, marring the ordinarily visible portions of the casing.

I claim:

1. An automatic valve of the class described, comprising a casing; a hollow float movable in said casing and charged with a heat-expansible fluid; a flexible diaphragm carried by the said float and exposed to the pressure developed therein; a vent-valve adapted to be closed by the outward flexure of the said diaphragm; and a limiting-member carried by the said float and positioned to limit the normal outward flexing of the said diaphragm under the pressure developed in the said float and extending inward from the flexure point of the said diaphragm toward the center thereof, a distance of at least one-fifth the total distance between the said points.

2. An automatic valve of the class described, comprising a casing; a hollow float movable in said casing and charged with a heat-expansible fluid; a flexible diaphragm carried by the said float and exposed to the pressure developed therein; a vent-valve adapted to be closed by the normal outward flexure of the said diaphragm; and a limiting-ring having a central perforation and coupled to the said float in position to limit the outward flexing of the said diaphragm and extending inward from the flexure point of the said diaphragm toward the center thereof, a distance of at least one-fifth the total distance between the said points.

3. An automatic valve of the class described, comprising a casing; a hollow float movable in said casing and charged with a heat-expansible fluid; a cup-shaped flexible diaphragm carried by the said float and exposed to the pressure developed therein; a vent-valve adapted to be closed by the outward flexure of the said diaphragm; and a cup-shaped limiting-ring having a central perforation and fitting within the said cup-shaped diaphragm in position to limit the outward flexing thereof.

4. An automatic valve of the class described, comprising a casing; a hollow float movable in said casing and charged with a heat-expansible fluid; a flexible diaphragm forming the bottom wall of the said float; a vent-valve adapted to be closed by the outward flexure of the said diaphragm; an adjusting-screw projecting through the bottom of the said casing and formed at its inner end with a head engaging the underface of the said diaphragm; a siphon-tube extending laterally outward through the said casing; and an L-shaped retainer located within the said casing and having one of its arms engaging the said siphon-tube and the other arm engaging the said adjusting-screw beneath the head thereof.

5. An automatic valve of the class described, comprising a casing; a hollow float movable in said casing and charged with a heat-expansible fluid; a flexible diaphragm forming the bottom wall of the said float; a vent-valve adapted to be closed by the outward flexure of the said diaphragm; an adjusting-screw projecting through the bottom of the said casing and formed at its inner end with a head engaging the underface of the said diaphragm; a siphon-tube extending laterally outward through the said casing; an L-shaped retainer located within the said casing and having one of its arms engaging the said siphon-tube and the other arm engaging the said adjusting-screw beneath the head thereof; and an abutment in the said casing positioned to prevent the outward radial displacement of the said retainer.

6. An automatic valve comprising a casing; a vent valve; a thermostatic element located within the said casing and operating under the influence of a rise in temperature to close the said vent valve; a screw member having a head located within the said casing; a siphon-tube extending laterally outward through the said casing; and a retainer having one end engaged with the said siphon-tube and the other end engaged with the said screw member beneath the head thereof.

7. An automatic valve comprising a casing; a vent valve; a thermostatic element located within the said casing and operating under the influence of a rise in temperature to close the said vent valve; a screw member having a head located within the said casing; a siphon-tube extending laterally outward through the said casing; and a retainer having its respective opposite ends bifurcated for respectively embracing the said siphon-tube and the said screw member beneath the head thereof.

In testimony whereof, I have signed this specification.

ADOLPH C. RECKER.